United States Patent [19]

Sollich

[11] 4,059,378
[45] Nov. 22, 1977

[54] METHOD AND A MACHINE FOR REMOVING FROM THEIR MOLDS MOLDINGS OF CONFECTIONERY MASSES WHICH HAVE BEEN FORMED INTO CHOCOLATE CENTERS, BARS OR OTHER SINGLE OR CONTINUOUS MOLDINGS

[75] Inventor: Helmut Sollich, Kalletal-Talle, Germany

[73] Assignee: Sollich AG, Bad Salzuflen, Germany

[21] Appl. No.: 707,096

[22] Filed: July 20, 1976

[30] Foreign Application Priority Data

Dec. 9, 1975 Germany .............................. 2540613

[51] Int. Cl.² .............................................. A23G 3/12
[52] U.S. Cl. .................................. 425/362; 425/220; 425/373
[58] Field of Search .............. 425/367, 373, 362, 230, 425/220, 407, DIG. 55, 357, 437, 363; 426/394

[56] References Cited

U.S. PATENT DOCUMENTS

| 1,971,087 | 8/1934 | Werner | 425/362 |
|---|---|---|---|
| 2,167,388 | 7/1939 | Kremmling | 425/220 |
| 2,208,905 | 7/1940 | Kremmling et al. | 425/220 |
| 2,724,348 | 11/1955 | Neutelings et al. | 425/337 |
| 2,813,033 | 11/1957 | Schneider | 425/373 X |
| 2,815,573 | 12/1957 | Trelease | 425/362 |
| 3,205,837 | 9/1965 | Fay | 425/DIG. 55 X |
| 3,249,468 | 5/1966 | Von Drachenfels | 425/407 X |
| 3,679,790 | 7/1972 | Alfsen | 425/363 X |
| 3,689,280 | 9/1972 | Werner | 425/373 X |

FOREIGN PATENT DOCUMENTS 2,402,019 7/1975 Germany .............................. 425/373

Primary Examiner—Francis S. Husar
Assistant Examiner—W. R. Briggs
Attorney, Agent, or Firm—Browdy and Neimark

[57] ABSTRACT

A machine for molding confectionery masses into chocolate centers which includes a feed hopper which feeds a molding cylinder having molding recesses, a single intake cylinder between the feed hopper and the molding cylinder for pressing the mass into the recesses, and a suction belt embracing part of the circumference of the molding cylinder for the removal of the finished moldings.

4 Claims, 6 Drawing Figures

METHOD AND A MACHINE FOR REMOVING FROM THEIR MOLDS MOLDINGS OF CONFECTIONERY MASSES WHICH HAVE BEEN FORMED INTO CHOCOLATE CENTERS, BARS OR OTHER SINGLE OR CONTINUOUS MOLDINGS

1. Field of the Invention

The invention relates to a method of removing from their molds moldings of confectionery masses in the form of chocolate centers, bars, or other single or continuous moldings. The invention also proposes a machine for performing the method.

2. Background of the Invention

Centers for chocolates have in the past been produced by extrusion or on an automatic molding machine, usually by employing two generally milled intake or pressure cylinders which force the mass either through a die or into molding recesses in a moulding cylinder. It has been found that in these machines especially masses which are soft and have a high fat content suffer damage, and that in the case of automatic moulding machines they fail to detach themselves from the molding recesses. Another drawback of these known machines is that the frictional engagement of the mass by the pressure and intake rollers is excessive and causes the mass to become hot, resulting in a considerable quantity of fat being squeezed out of the mass.

On the other hand, it is the practice when processing hot masses after cooking and mixing first to cool these masses on cooling tables or in cooling tunnels to a temperature at which they can be extruded and cut, a procedure which not only requires long cooling zones and an extruder but also very expensive cutting equipment which first cuts an extruded blanket into strips, separates the strips and finally by cross cutting chops them to length.

SUMMARY OF THE INVENTION

In both instances the requirement of mechanical apparatus is very considerable. It is therefore an object of the present invention to eliminate these drawbacks and to provide a method and a machine which without a major expenditure in means permits masses used in the production of confectionery, such as marzipan, nut and fruit masses, truffle, croquant, coconut or fat-containing fondant masses, to be molded economically to form chocolate centers, bars or other molded pieces of confectionery, particularly in such a way that the moldings readily come away from their molds and the mass is not changed either in consistency of in fat content.

According to the invention this is achieved by pressing or rubbing the mass by means of an intake cylinder into the molding recesses of a likewise rotating molding cylinder and, if necessary, additionally cooling or heating the intake and/or moulding cylinders according to the composition and structure of the processed mass, the moldings being pulled out of the molding recesses in the molding cylinder by a suction belt of a kind already known in the art. The result is an extremely gentle molding process which does not impair the original structure of the mass. However, at the same time, the present proposal affords a means of also forming hot sugar masses, such as fudge (mixture of caramel and fondant), whipped or unwhipped chewing or nougat mass as well as candy cream, immediately after cooking and mixing, into bars, blocks or mouldings in a manner eliminating the need for the hitherto conventional cooling tables, cooling tunnels, extruders and cutters.

The machine for performing the method comprises a molding cylinder rotating underneath a feed hopper and provided in its circumferential surface with molding recesses, between the feed hopper and the molding cylinder a single intake having a substantially smooth surface for pressing or rubbing the mass into the molding recesses and, for the removal of the moldings from the recesses, a suction belt of known kind enveloping part of the circumference of the molding cylinder. With advantage there is further provided between the intake cylinder and the molding cylinder an adjustable parting member which cleanly strips the mass from the cylinder surfaces.

For processing hot confectionery masses it is preferred to provide a molding and/or intake cylinder which in its interior contains cooling means, have particularly deep cooling means. For the purpose of lengthening the cooling zone the cylinders which are provided with cooling means will conveniently have a larger diameter. Nevertheless, a cooling belt may be arranged to carry away the moldings that have come out of the molding recesses in the moldng cylinder or alternatively the suction belt may also function as a cooling belt.

Preferably the intake cylinder, the moulding cylinder and the suction belt may each be provided with separate drive means to permit the working respectively peripheral speeds of these components to be adjusted to suit the structure of the processed mass and the shape of the product. The molding cylinder may be easily exchangeable so that simply by the replacement of this cylinder the entire machine can be adapted to any shape of molding required. According to the disposition and shape of the molding recesses in the molding cylinder differently shaped products or different assortments of products can be molded simultaneously by one molding cylinder. Apart from different kinds of chocolate centers entire bars or continuous moldings can be produced.

Another advantage can be secured if the molding and/or intake cylinders can be heated or cooled, even when no hot masses are being molded. This permits the machine to be even more flexibly adapted to different types of mass and to moldings of different shapes and kinds.

The removal of the moldings from their molds will be assisted by making the molding cylinder of a synthetic plastics material which helps the moldings to come away from the molds or alternatively the molding cylinder may be fitted with synthetic plastics molding cups for forming the molding recesses.

Moreover, according to the invention, and for the purpose of facilitating a smooth flow of mass through the feed hopper the latter may also be provided with an inner lining made of a synthetic plastics material that assists the separation of the mass from the surface, such as PTFE or the like. The intake cylinder forming part of the feed hopper floor is mounted between the downwardly extended side walls of the feed hopper with which it makes sealing contact. With advantage the intake cylinder may be a metal cylinder provided with a roughened circumferential surface.

Another considerable advantage will be secured if the entire machine is mounted on a mobile frame enabling the machine to be pushed into direct adjacence with an enrobing machine, a cut-and-wrap machine or the like, a possibility which allows the production of chocolates and bars to be even more flexibly organised.

BRIEF DESCRIPTION OF THE DRAWINGS

The thought which underlies the invention can be embodied in diverse ways. One such embodiment is illustratively shown in the accompanying drawing in which.

DESCRIPTION OF PREFERRED EMBODIMENTS

A mobile frame 3 mounted on castors 1 and fitted with locating jacks 2 is completely enclosed in casing 4 which contains the drive and control means that will be later described.

Figure 1:
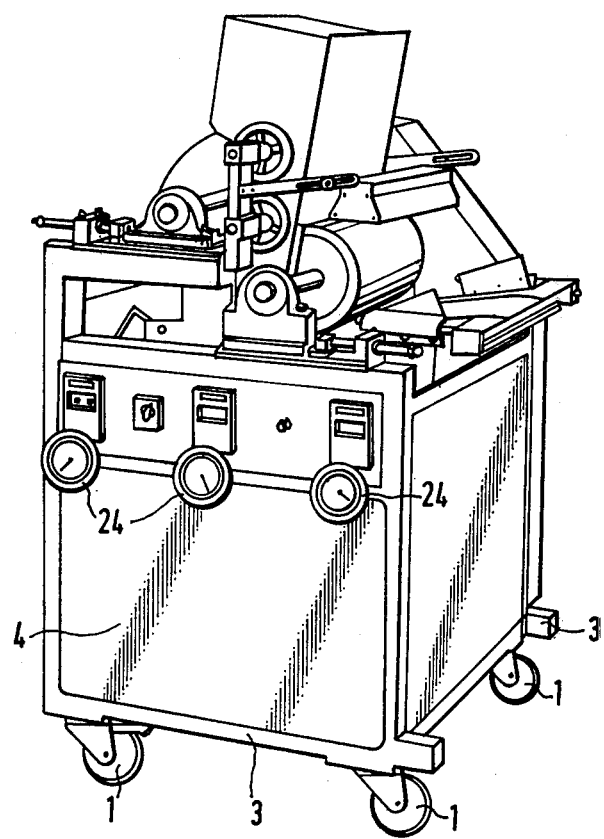
FIG. 1 is a perspective view of the proposed machine.
Figure 2:
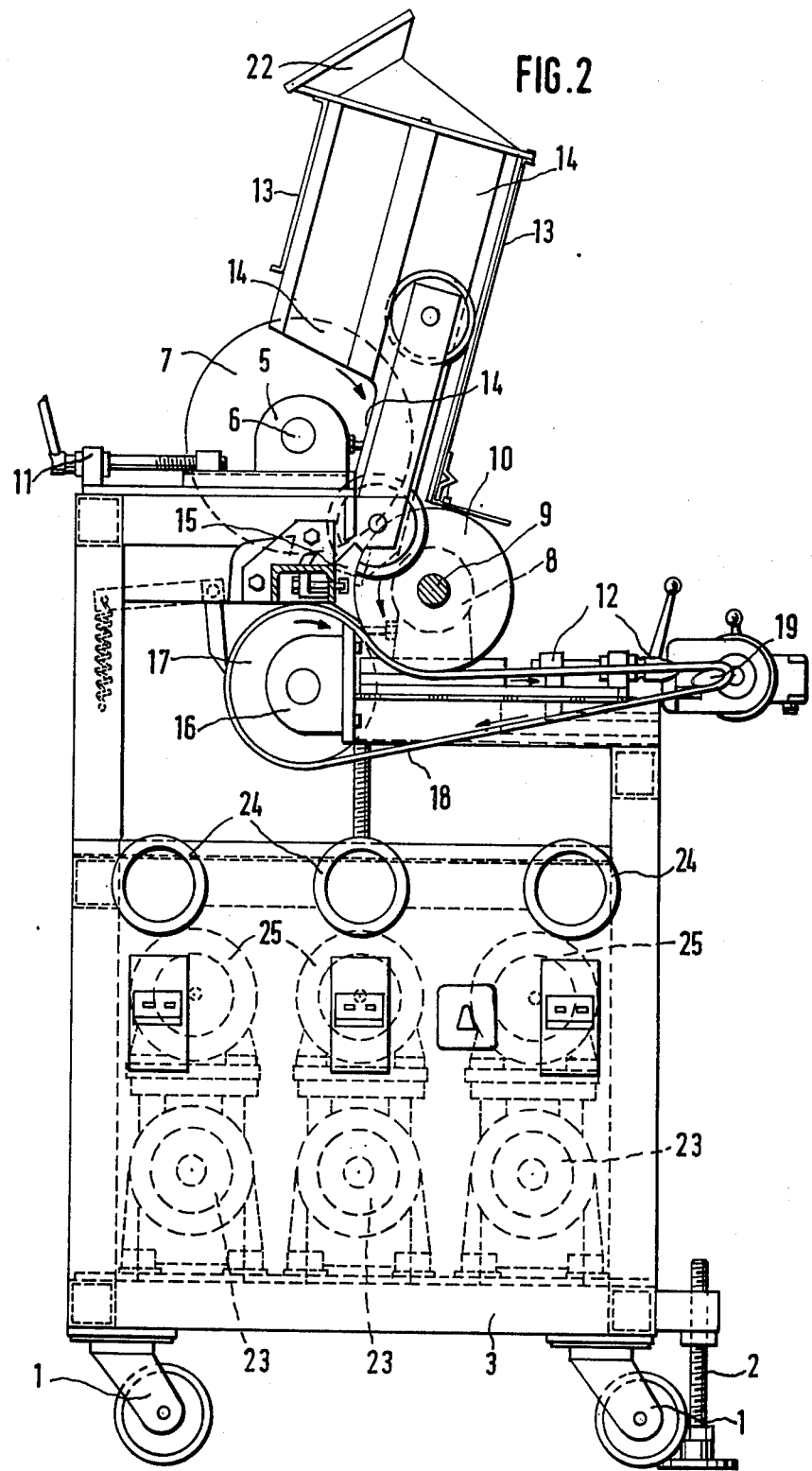
FIG. 2 is a schematic representation revealing the general construction of the machine, but only parts relevant to the invention are shown.

Mounted at the top of the machine frame on a shaft 6 running in bearings 5 on each side is an intake cylinder 7 and at a lower level on a second shaft 9 running in bearings 8 is a molding cylinder 10 — also known as a 'motive' cylinder. The bearings 5 and 8 are themselves mounted in horizontal ways and adjusting means 11 and 12 permit them to be relatively shifted and located as desired. As shown in FIG. 2, the diameter of the intake cylinder 7 may be considerably larger than the diameter of the molding cylinder 10.

A substantially box-shaped feed hopper 13 — the hopper for feeding the mass — is located above the intake cylinder 7 — also referred to as the press roller — which has a substantially smooth cylindrical surface slightly roughened for instance by sandblasting. The top of the feed hopper is covered by a funnel-shaped charging head 22. The inside surface of the hopper walls are coated with a plastic lining, such as PTFE, which assists mass flow, and the intake cylinder which forms at least part of the hopper bottom runs in sealing contact with the downwardly extended side walls 14 of the hopper.

Facing the intake cylinder 7 and completely covering the exit opening of the hopper is the molding cylinder 10, a press or thrust member 15 shaped to conform with the cylinder peripheries being located facing the open nip between the two cylinders 7 and 10. This member can be appropriately adjusted to press or rub the mass carried down from the feed hopper 13 by the intake cylinder into the molds recessed into the molding cylinder 10 when the two cylinders revolve in the indicated arrowed directions.

According to the nature of the mass that is being molded and the kind of moldng recesses that are to be filled the two cylinders 7 and 10 are set by means of their adjusting means to the required relative positions, and the thrust member 15 is then adjusted accordingly.

Mounted in lateral bearings 16, which may also be adjustable, underneath the cylinder pair 7 and 10 is a return roller 17, rotating in the arrowed direction, of an endless suction belt 18 which envelops part of the circumference of the molding cylinder 10 and runs over a likewise adjustable deflecting rod 19 on the delivery side of the machine. The suction belt 18 is made of a material which has a structure that seeks to pull the moldings 21 out of the recesses 20 in the molding cylinder 10, because their adhesion to the suction belt 18 exceeds their adhesion in the molding recesses of the molding cylinder. The latter may with advantage consist of a plastic material which assists separation of the mass or, alternatively, suitable synthetic plastic receptacles may be fitted into the circumferential surface of the cylinder 10 to provide the required molding recesses.

The suction belt 18 also forms the delivery means for the moldings which are thereby transferred into the entry of a chocolate enrober, this being facilitated by the fact that the entire moulding machine can be readily pushed alongside the enrobing machine.

Figure 3:
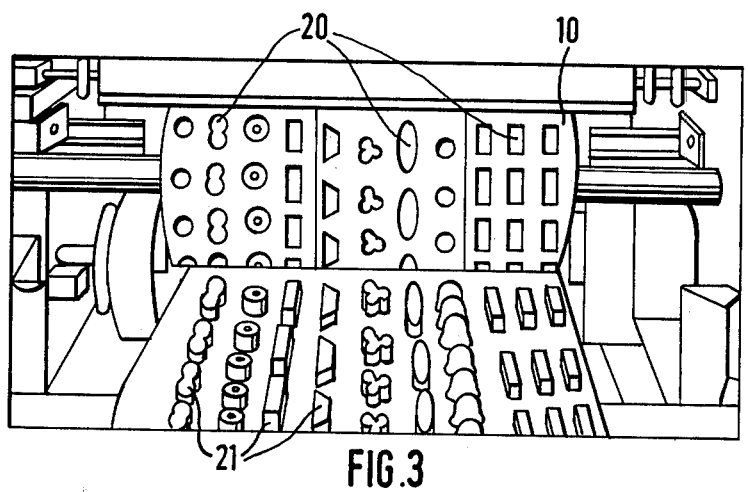
FIGS. 3 and 4 are views into the delivery mouth of the machine when fitted with different kinds of molding cylinders.
Figure 4:
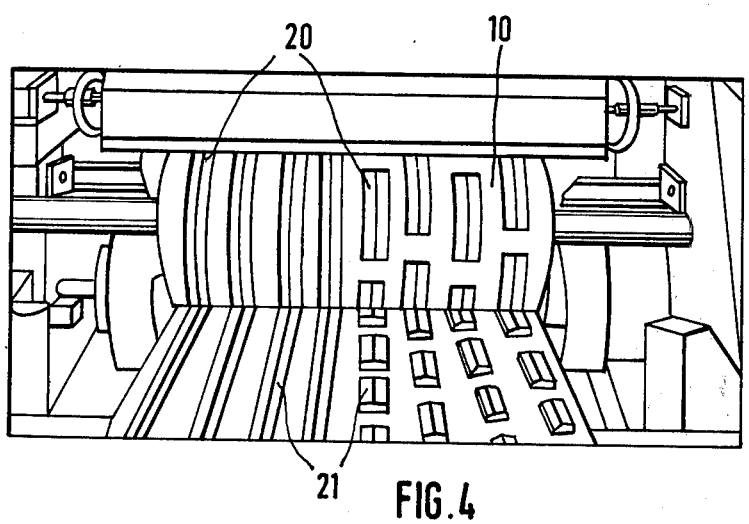

The molding cylinder 10 is easily replaceable to permit the machine to be quickly adapted to the production of a different type of center, bar or assortment of moldings. FIGS. 3 and 4 are diverse embodiments of molding cylinders, the cylinder in FIG. 3 producing chocolate centers of different shapes or different groups of centers, whereas that in FIG. 4 is adapted to produce continuous bar sections or ropes.

Intake cylinder 7, molding cylinder 10, and suction belt 17, 18 are each associated with a separate motor 23 so that their working speeds can be independently controlled by handwheels 24 and gear means 25 for the purpose of permitting a flexible adaptation of the machine to the nature of the mass or molding that is being processed.

Figure 5:
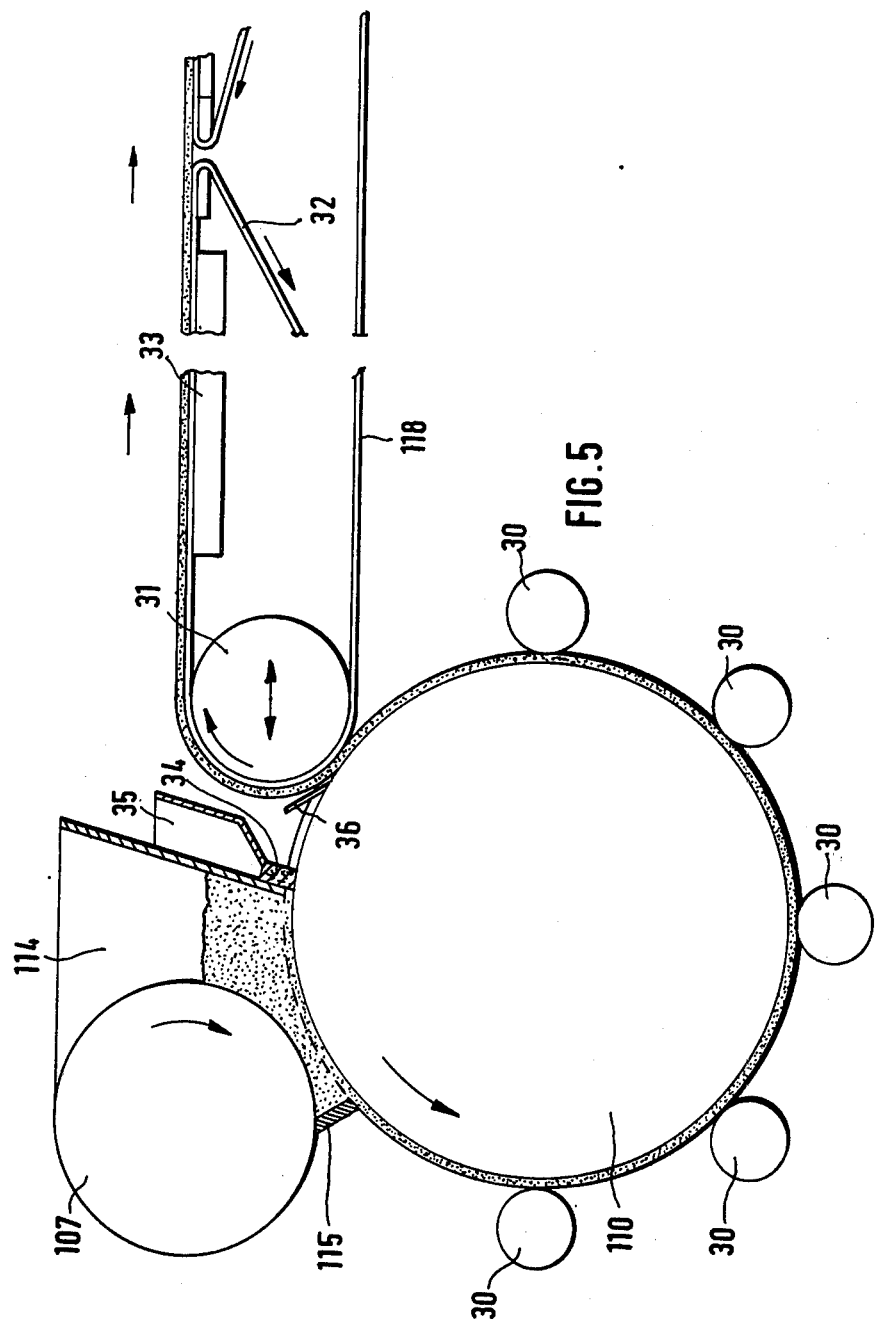
FIGS. 5 and 6 are schematic representations of two alternative embodiments of a machine intended principally for processing hot confectionary masses.
Figure 6:
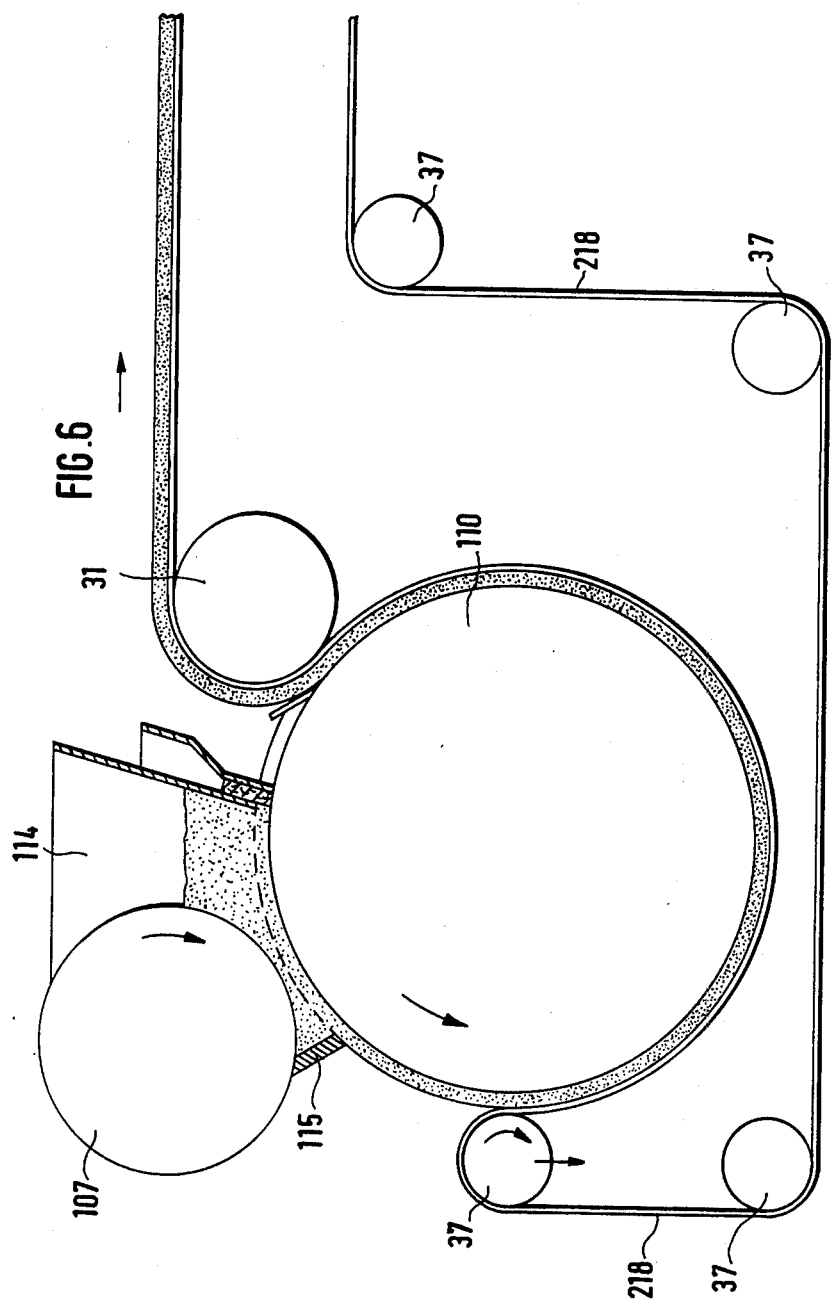

The embodiment of the machine illustrated in FIGS. 5 and 6 is a further development of the machine that has been described, and is intended principally as a cooling and molding machine for processing hot masses that are mechanically further processed immediately they leave the cooking stage and are therefore charged into a feed hopper 114. This hopper is constructed analogously to that in the previously described embodiment of the machine, i.e. its interior is lined with PTFE or the like. Mounted between the side walls of this feed hopper 114 is an intake cylinder 107 which revolves in the arrowed direction and below this is the molding or "motive" cylinder 110 which for the sake of providing improved cooling for the mass has a larger diameter than that in the previous embodiment, though otherwise with respect to the released molds and the material of which it is made it agrees with the previously described molding cylinder 10.

Both the intake cylinder 107 and the molding cyliner 110 are equipped in their interiors with cooling means not specially shown in the drawing, and they are provided with independent drive means, as already described.

The hot mass which is charged into the feed hopper 114 is not only cooled by the two cylinders 107 and 110 but also pressed by cylinder 107 and the cooperating thrust member 115 into the molding recesses in the molding cylinder 110. In order to prevent the moldings from falling out of the molds in cylinder 110, hold-on rollers 30 which bear against the circumference of cylinder 110 may be used when it is desired for instance to mold continuous sections of mass in annular grooves provided in the circumference of cylinder 110.

For the purpose of removing the moldings from the molding recesses a suction belt 118 is provided, as in the previous embodiment. This belt runs over a return and driving roller 118 which makes contact with the peripheral surface of the molding cylinder. The suction belt 118 may also function as a cooling belt or it may be arranged to cooperate with a cooling belt 32 and, finally, it may be drawn over cooling elements 33.

In order to facilitate the removal of the moldings from the molding recesses a felt 34 may be provided to transfer a parting oil, fat, or the like from a supply vessel 35 into the empty molding recesses. A similarly profiled stripper 36 which engages the annular molding grooves in cylinder 110 is provided as a safety device for ensuring that all the molding are correctly lifted out of the grooves if this has not already been done by the suction belt.

The arrangement illustrated in FIG. 6 differs from that in FIG. 5 merely in that the hold-up rollers 30 are replaced by a suction belt 218 which is taken over guide rollers 37 and which envelops nearly the entire circumference of the molding cylinder 110.

This arrangement will be preferrred if the moldings are not continuous but have the form of separate moldings.

Naturally provision may be made for continuous sections to be cut to the required lengths by a conventional chopper.

The working width of the illustrated machines equals the working width of the machines in which the molded articles are to be further processed, such as of chocolate enrobers or a so-called cut-and-wrap machine in which lengths cut off continuous moldings are enrobed if desired and/or finally wrapped.

I claim:

1. A machine for molding confectionery masses into chocolate centers, bars, or other continuous or separate moldings, comprising:

a molding cylinder provided with molding recesses in its circumferential surface;

a suction belt disposed below and partially enclosing said molding cylinder, for removal of formed parts from the molding recesses of the molding cylinder;

a single intake cylinder disposed immediately adjacent to said molding cylinder, said intake cylinder having a larger diameter than said molding cylinder, said intake cylinder being operable to press the mass into the molding recesses of the molding cylinder;

feed hopper means, disposed above said intake cylinder and said molding cylinder, for directing feed onto said intake cylinder and onto said molding cylinder upstream of said intake cylinder;

drive means operable to cause rotation of said molding cylinder and said intake cylinder and to dirve said suction belt; and control means operable to control the rotation velocities of said molding cylinder and said intake cylinder.

2. A machine in accordance with claim 1 further including a mobile machine frame on which is mounted said feed hopper, intake cylinder, molding cylinder, suction belt, drive means and control means, said machine frame being pushable into position for cooperation with the intake of another processing machine, such as an enrober or a cut-and-wrap machine.

3. A machine in accordance with claim 1 further including an adjustable parting means, disposed between said intake cylinder and said molding cylinder, for cleanly separating the mass from the cylinder surfaces other than said molding recesses.

4. A machine in accordance with claim 1, further including adjusting means for relatively shifting and adjustably locating said intake cylinder and said molding cylinder.

* * * * *